(12) United States Patent
Hunt

(10) Patent No.: US 6,259,776 B1
(45) Date of Patent: Jul. 10, 2001

(54) SYSTEM FOR CONTROLLING TELECOMMUNICATION OVERLOAD TRAFFIC

(75) Inventor: Rowland Geoffrey Hunt, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/091,777
(22) PCT Filed: Mar. 18, 1998
(86) PCT No.: PCT/GB98/00809
 § 371 Date: Jun. 22, 1998
 § 102(e) Date: Jun. 22, 1998
(87) PCT Pub. No.: WO98/43451
 PCT Pub. Date: Oct. 1, 1998

(30) Foreign Application Priority Data

Mar. 25, 1997 (EP) .................................................. 97302013

(51) Int. Cl.⁷ .................................................. H04M 15/00
(52) U.S. Cl. .......................... 379/113; 370/229; 370/232; 370/233; 370/234; 379/113; 379/220; 379/221
(58) Field of Search ..................................... 379/113, 137, 379/138, 198, 220, 221, 242, 244; 370/229, 465, 468

(56) References Cited

U.S. PATENT DOCUMENTS

| | | | |
|---|---|---|---|
| 4,284,852 | * 8/1981 | Szybicki et al. | 379/221 |
| 4,626,624 | * 12/1986 | Daisenberger | 379/137 |
| 5,067,074 | * 11/1991 | Farel et al. | 709/235 |
| 5,295,183 | * 3/1994 | Langlois et al. | 379/113 |
| 5,509,063 | * 4/1996 | Crabtree et al. | 379/221 |
| 5,933,481 | * 8/1999 | Macdonald | 379/137 |
| 6,018,519 | * 1/2000 | Ginzboorg | 370/236 |

* cited by examiner

Primary Examiner—Ahmad Matar
Assistant Examiner—Bing Bui
(74) Attorney, Agent, or Firm—Nixon & Vanderhye P.C.

(57) ABSTRACT

A telecommunications network includes a processor controlled switch and a network intelligence platform overload control function runs in the network intelligence layer. The overload control function measures the period of time taken to handle a call switching request and if the time taken exceeds a pre-determined quality of service threshold, it implements a call gapping function. The call gapping function modifies the gapping period such that requests to effect calls to particular destinations are spaced and any call arriving at a switching point prior to expiration of the gap period is automatically rejected by the local control processor. As the overload control function runs in a plurality of nodes, which may be file servers of the intelligence layer, the gapping period returned to the switch is dependent upon the perceived overload at the particular node. Traffic variations at the nodes may result in variations in the gapping period between nodes and therefore each node is arranged to communicate with other nodes to determine an average gapping period for the group of nodes and individual gapping periods in the nodes are relaxed towards the average value.

20 Claims, 6 Drawing Sheets

SYSTEM FOR CONTROLLING TELECOMMUNICATION OVERLOAD TRAFFIC

BACKGROUND OF THE INVENTION

1. Field of the Invention

The present invention relates to telecommunications networks and more particularly to telecommunications networks of the kind having service switching points with local software control arrangements and service control points to which the local software control arrangements may apply for instructions on handling (eg) number translation functions.

2. Related Art

Telecommunications networks of the kind having service control points in an intelligent overlay layer enable rapid provision of special services to customers without requiring distribution of new software or data to every computer controlled switching point. Thus, in these intelligent networks local processing capability in, for example digital main switching units, may be triggered by the occurrence of certain events to refer to the external intelligence for further instructions on call processing.

For example, when an originating customer dials a code representing a special service rather than a destination switch, triggering of the control processor of the service switching point will result in a signalling message being sent to a remote service control point indicating the code which has been dialled. In the service control point a server will analyse the dialled code and return instructions for call handling to the service switching point. Such instructions may be to allocate a receiver, collect a further 'n' digits and report back. Once the further digits have been received the entire process using the whole number may be repeated so that the service control point may now translate the entire received number to a switching destination of the core transport network of the telecommunications system. The service switching point may now switch the call through in accordance with these instructions.

Telemarketing and televoting services in which customers are given a dedicated telephone number to dial in response to advertising or television programs are now well known. It is also known that communications networks may become congested as a result of a mass response to special offers. For example, where a destination telephone number is advertised on a national basis and significant numbers of customers attempt to make a call to the telephone number, a focused overload of calls seeking to use incoming trunks to the destination main switching unit and/or the destination local exchange can result in switch blocking of normal service traffic.

In serious cases of focused overload attempts by other main switching units to communicate with the congested switching unit by using alternative routes may result in the congestion spreading outwards across the network potentially leading to a complete communications freeze. One method of dealing with focused overloads in communications networks is disclosed in our co-pending patent application number GB94/02512 filed under the Patent Co-operation Treaty. In this PCT application there is disclosed a method of restricting calls having a common call identity when the rate at which calls to the destination specified are failing exceeds a predetermined level. This method automatically restricts calls though the transport network to the destination by introducing a gap between successive calls from one originating point. Each originating node may have its own perception of the destination overload such than an imbalance between call completions from one area and call completions from another area occurs.

Once this method of controlling calls to congested destinations is applied in the intelligent network, congestion may also adversely affect access to the service control point. In practice the service control point comprises a number of traffic servers to which originating requests for instructions are distributed. Here, however, each traffic server may develop its own perception of the traffic overload and if the service switching point application from a particular service switching point is handled by a first traffic server and a subsequent application by a different traffic server conflicting call restriction instructions may be returned.

SUMMARY OF THE INVENTION

According to the present invention there is provided a telecommunications network including an overload control arrangement, the overload control arrangement restricting call connections to a predetermined destination when traffic to such a destination exceeds a predetermined level, said arrangement comprising a plurality of identical overload control functions each running in a respective one of a plurality of nodes of the network and each having a respective gapping period determined from the perceived overload level at the respective node, the overload control functions exchanging data defining their respective gapping periods and effecting adjustment towards an average gapping period so that substantial differences between respective gapping periods from respective nodes to any one predetermined destination is avoided Preferably a plurality of counters are provided which are allocated by the overload control function, the counters being decremented at a predetermined regular rate and being incremented each time a call to a respective controlled destination fails a predetermined quality of service threshold. Comparison means may be arranged to compare the value in each counter at periodic intervals and if the respective value held by any counter exceeds a first threshold value causes a step increase in the gapping period associated with the respective controlled destination.

If the value in any counter is below a pre-determined second threshold value a step decrease in the gapping value associated with the respective controlled destination may be applied.

In a particular embodiment the nodes comprise fileservers in the service control platform which receives requests from a plurality of service switching points and provides instructions for switching to the service switching points together with an indication of the call gapping period to be applied.

BRIEF DESCRIPTION OF THE DRAWINGS

A telecommunications network in accordance with the invention will now be described by way of example only with reference to the accompanying drawings of which.

DETAILED DESCRIPTION OF EXEMPLARY EMBODIMENTS

Figure 1:
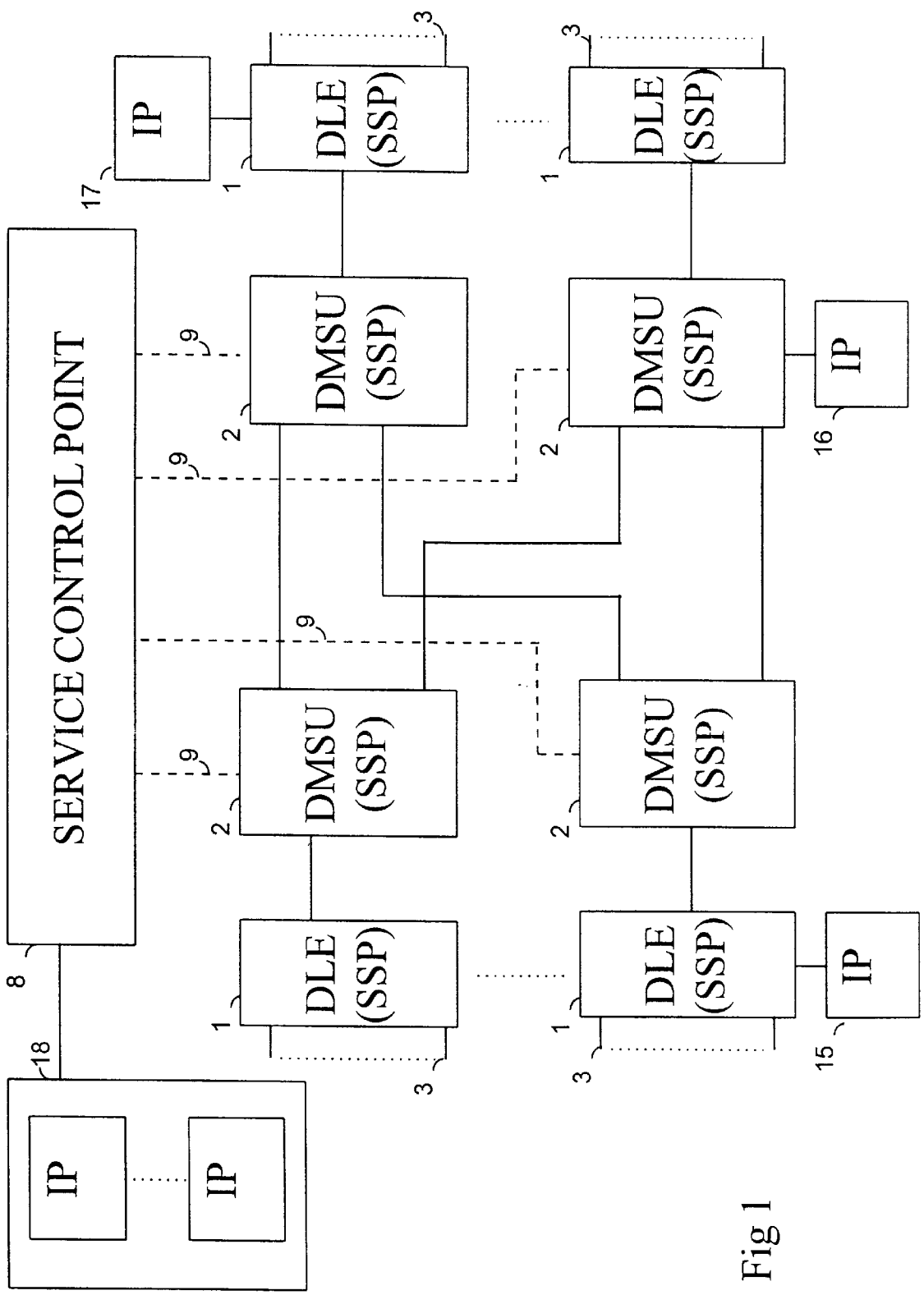
FIG. 1 is a block schematic diagram of a part of the intelligent network.

Referring to FIG. 1, in a telecommunications network, for example the public switched telephone network (PSTN), a number of service switching points in the form of digital local exchanges (DLEs) 1 and digital main switching units (DMSUs) 2 are provided. Using switched time division multiplexed channels these allow any of a multiplicity of customer line connections 3 on each of the DLEs 1 to be connected to any other point in the network.

Traditional telephone networks allocate to each of the customer connections 3 a dedicated network number which is the number signalled by any other connection 3 to effect a communications call. A part of the network number determines the destination DLE 1, the remainder determining the actual connection on that exchange.

As customers have requested more complex communications services the relationship between the telephone number signalled by a calling customer and the destination of the call has become very imprecise. Further, specialised services such as a single dedicated telephone number representing a multiplicity of local service points, televoting and the like require the network to make many decisions in respect of any singled dialled telephone number.

As digital communications networks have evolved the speed at which connections through the system can be effected and the flexibility which may be offered to customers has enabled specified services to be provided at particular points of the network and multiple switching operations to be performed during the course of a single call. For example, so called intelligent peripherals 15, 16, 17, 18 can be switched in to provide voice announcements of a dedicated type, to collect televotes, to collect additional digits in prompt-and-collect services or to provide other information prior to final connection of a call to a destination point. Clearly, while many of these interpretations can be carried out by local control computers in the DLEs 1 or in the DMSUs 2 upgrading the software in every exchange or switching unit to cater for each eventuality is not the most efficient way. Thus, some intelligent functions are concentrated at one or more service control points 8 which are accessed using C7 signalling protocols over packet switched signalling connections 9.

Now, local communications processors, rather than containing the details of every required network translation, can be triggered to apply to the service control point 8 for further direction on the handling of the call. Such triggering may result from a particular class of service from an originating line 3, a part of the number dialled, network conditions, the destination or the terminating line class of service for example. Whenever such triggering occurs the local processors forward information to the service control point 8 which may instruct the connection of one of the intelligent peripherals 15 to 18 or may provide switching instructions to the service switching point to cause the call to be connected through to another destination point 3.

Figure 2:
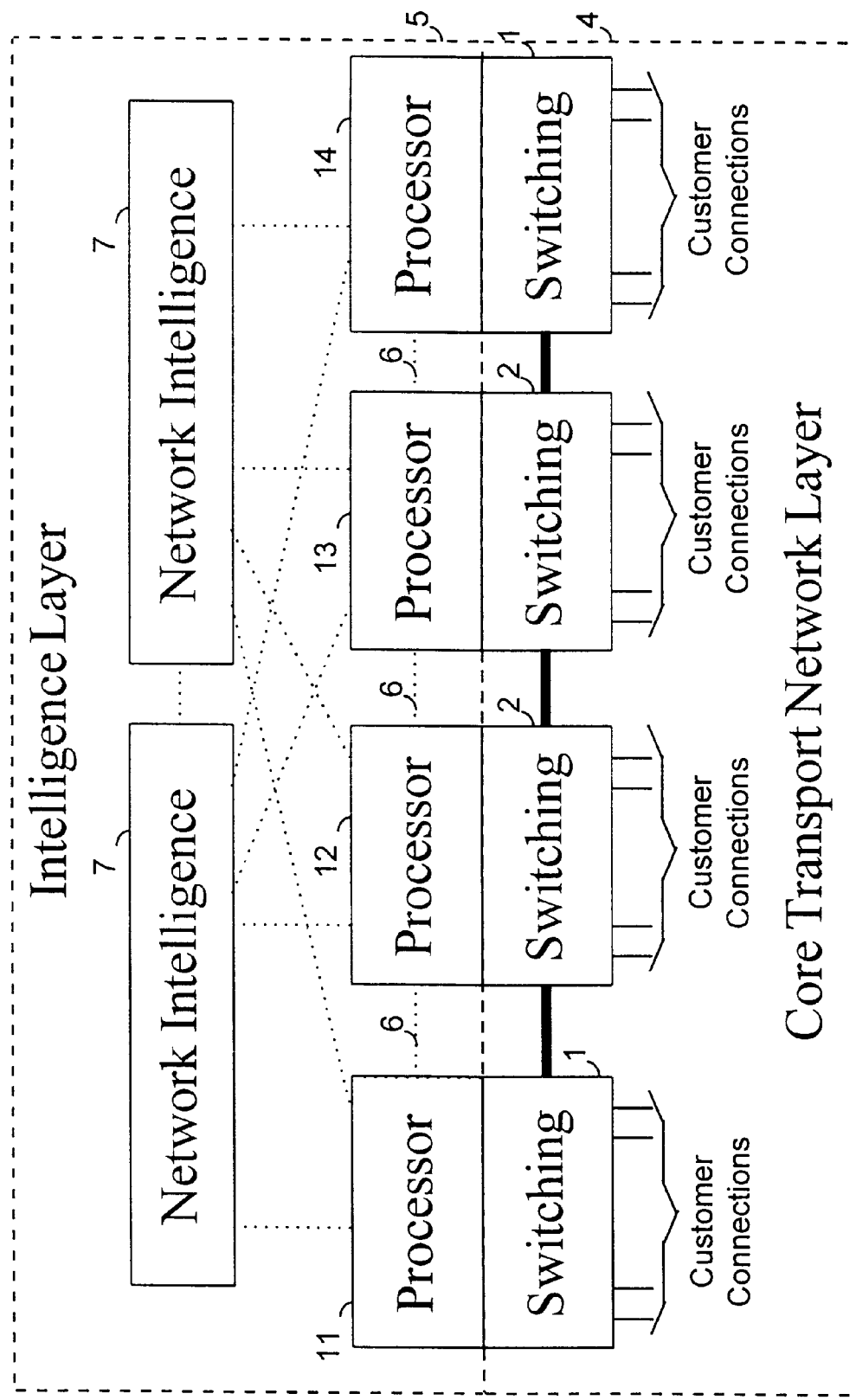
FIG. 2 is an interpretation of the network of FIG. 1.

Referring additionally to FIG. 2, the network may be considered as comprising a core transport network layer 4 made up of the switching in the DLEs and DMSUs (the service switching points) 1 and 2 and an intelligence layer 5.

The intelligence layer 5 comprises the local processors associated with the DLEs and DMSUs (11 to 14) and network intelligence 7 which is to be found in the service control point 8. In order to effect switching through the core transport network layer 4 the processors 11 to 14 communicate with each other by way of packet switched signalling paths 6 using C7 signalling in response to instructions either by way of the packet switched signalling path 9 from network intelligence or as a result of local processing.

It is known that certain events can give rise to a rapid increase in customer activity. One such increase in customer activity can arise in telemarketing of limited special offers or televoting during broadcasts of radio or television programmes. Such activity can result in a focused overload at points in the switching network and may have an adverse effect on normal telecommunications traffic. In published PCT application number Wo95/14341 the assignee has disclosed an automatic call restriction system for dealing with focused overloads in the public switched telephone network. Essentially the operation comprises counting each call which fails to connect and if the number of failures over a given period of time, exceeds a particular threshold preventing further attempts to effect connection to a particular destination for a predetermined period of time. This method of automatic call restriction or "call gapping" results in an engaged signal being returned to the calling customer at a more local service switching point so that network switching resources and subsequent processing power in the DMSU's or destination digital local exchanges are not used.

Figure 3:
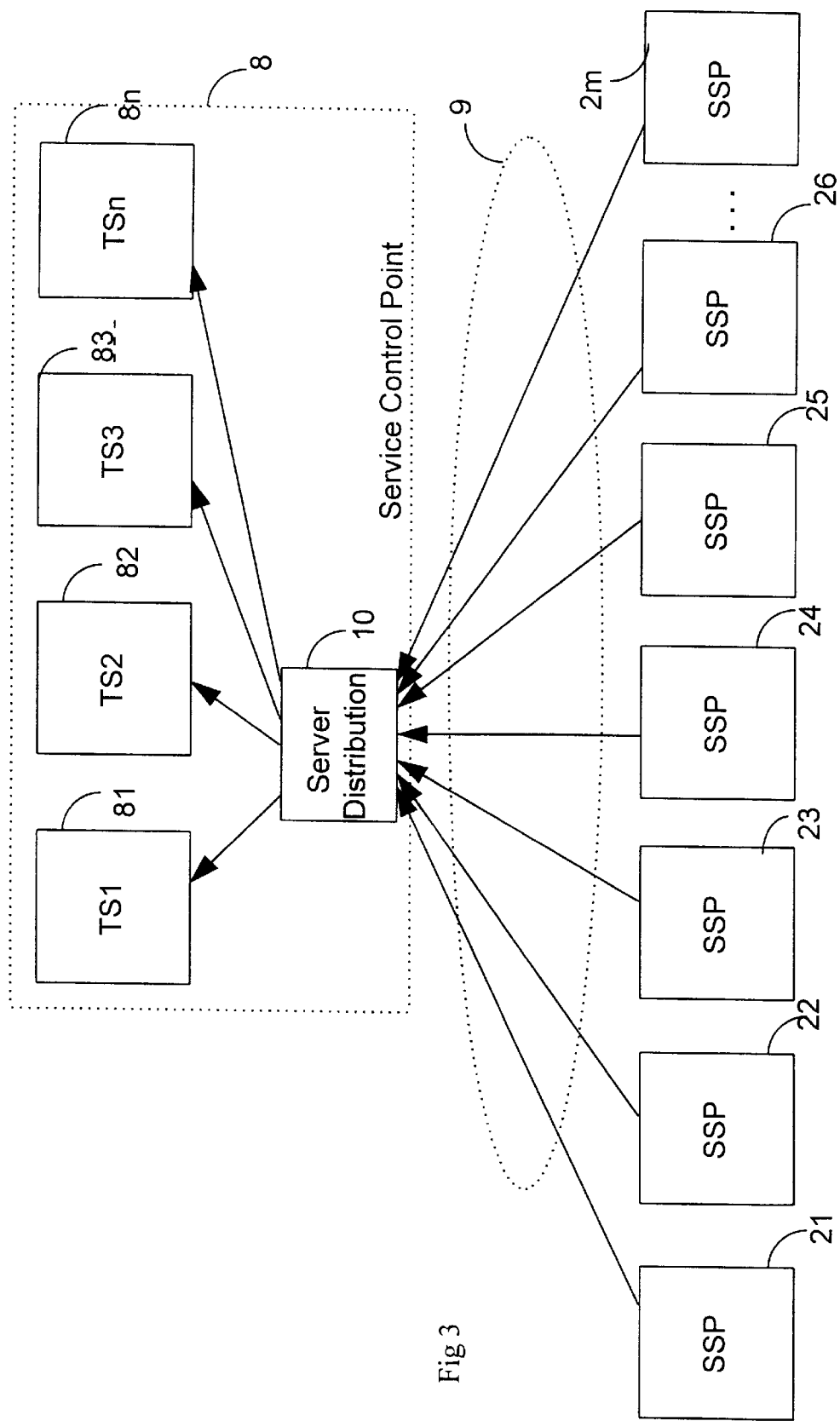
FIG. 3 is a block schematic diagram showing access and distribution of requests from service switching points.

Now, in an intelligent network of FIGS. 1 and 2 and referring now additionally to FIG. 3, specialised service numbers which trigger the local processor (11–14) result in a C7 signalling access to the service control point 8. The service control point 8 comprises a number of traffic servers 81 to 8N which each handle applications for further processing instruction from all of the service switching points 21–2M. Each application through the virtual network 9 from one of the service switching points is allocated by a server distribution mechanism 10. The server distribution mechanism 10 in the service control point 8 effectively performs a "round Robin" function in which each service application received from any service switching point is allocated on a sequential basis to the servers 81 to 8N. Thus, assuming that calls arrive sequentially at the service control point 8 for the purposes of illustration from the service switching points 21 to 2M in a numerical order and are to be handled sequentially by servers 81, 82, 83 only then the first call from SSP 21 is allocated to server 81, that from 22 to 82, that from 23 to 83. The next call from SSP 24 is allocated to server 81 from 25 to 82, 26 to 83 and 2M to 81 so that the next call from server SSP 21 will be allocated to server 82 and the sequence continues. It will of course be appreciated that calls do not normally arrive sequentially from servers 21 to 2M in this manner and in practice a plurality of applications from one of the servers may arrive before an application from another.

In the traffic servers 81 to 8N, once a service has been requested by a customer, it is usual for the maximum time to handle the request to be specified as a quality of service indicator. Now, if handling of a particular translation say from a tele-voting destination indicator exceeds the preset time limit then the server while returning the required information to the service switching point to enable the network connection to be completed causes a counter to be incremented.

Figure 4:
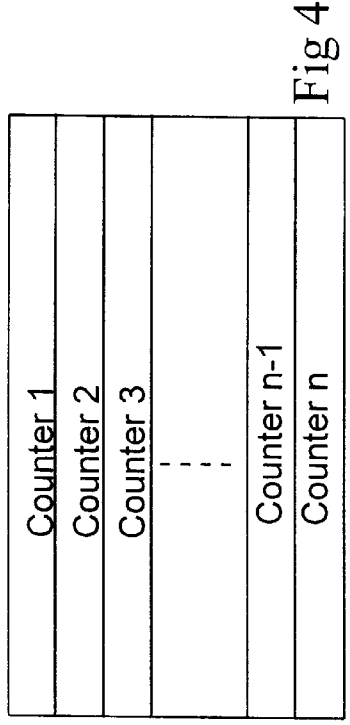
FIG. 4 is a schematic representation of data stored within a traffic server of FIG. 3.

Alternatively, if the service control point 8 detects an overload, for example by a service queue being full, on next application it will commence rejecting call applications. Such call rejections simply require an Intelligent Network Applications Protocol (INAP) Release Call instruction being returned to the requesting SSP. Similarly, if the SCP 8 detects destination overload, it may return INAP Release Call instructions to requesting SSPs 21 to 2M and such rejections result in an event being registered. Thus, on the first occasion on which the server notes a failure (an event) in respect of a particular destination, it will allocate one of a number of counters as shown in FIG. 4 to a particular called number. The counters are dynamically allocated to called numbers as and when required and are of the kind sometimes called "leaky bucket" counters.

In this kind of arrangement, counters are decremented at a fixed rate, say by 1 every 100 milliseconds, and are incremented by events. Thus, in the present arrangement if say server 81 of FIG. 3 detects a call failure it may increment counter 1. As calls to the particular called number rise so the number of perceived failures or rejections in traffic server 81 will rise and the counter 1 will be incremented at a greater than the fixed decrementing rate. Now for each counter there is allocated at least two thresholds. One of these thresholds represents a level above which the server 81 determines that the overload is continuing to increase whilst the other represents a level below which the overload may be considered to be abating.

Assuming then for counter 1 that an overload increases to the point at which the upper threshold is reached. In these circumstances the traffic server commences a gapping algorithm function which generates a figure representing a time period which on returning switching instructions to one of the local processors in response to an application for connection instruction also returns a gapping period for the local processor. This instructs the local processor of the service switching point to restrict calls to the triggered number. Thus if the local processor is triggered prior to expiry of the time-out dictated by the traffic server 81 it will return a busy signal to the calling customer without making an application to the service control point 8 for connection instruction.

Figure 5:
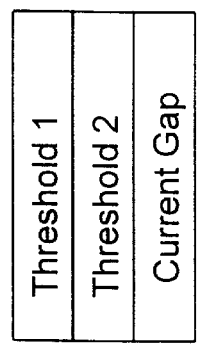
FIG. 5 is a graph showing gapping period against time during a period of focused overload and FIGS. 6a–c show schematically communications rings with the service control point of FIG. 1.
Figure 5:
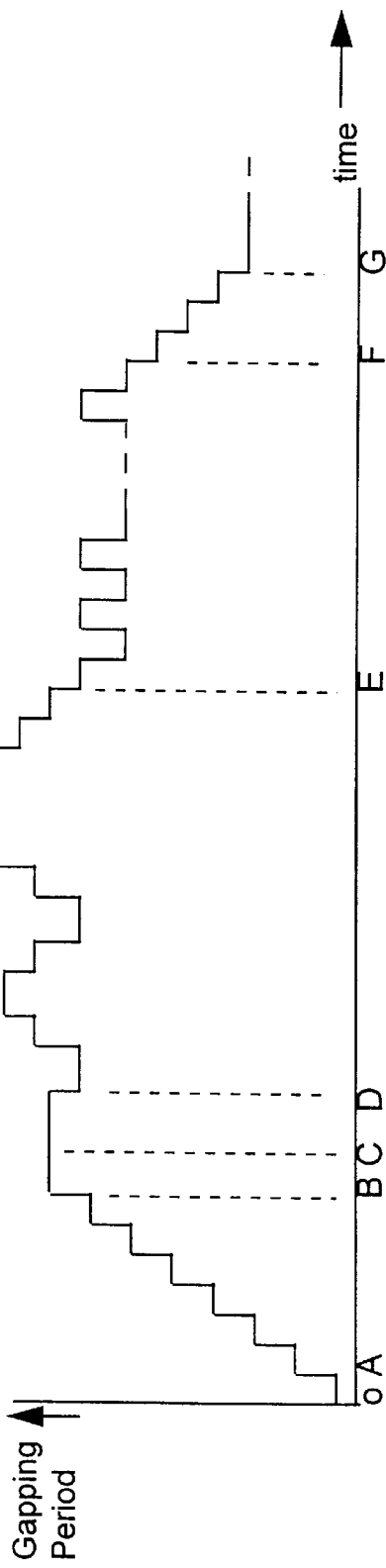

Referring also to FIG. 5 when a counter first crosses the threshold 1 (time point 0), then a current gap for example 500 milliseconds will be set in the counter gap data store. Thus each subsequent application from one of the service switching points to 1–2M through the signalling network 9 and the server distribution system 10 to the server 81 results in a switching instruction and a 500 millisecond gap instruction being returned. Now if the number of applications for number translation which are rejected continues to exceed the rate of decrementation of the counter 1 then at the next expiry of a period ("TB") at A since threshold 1 is still exceeded by counter 1 the current gap is incremented. Assuming that the standard increment is 500 milliseconds, for example it would now be implemented to 1 second and on the next application from one of the service switching points a longer gap in respect of this call will be returned.

Although the standard and initial gap value increments are, for illustration, given as identical, it will be realised that the gaps need not be identical and in practice the initial gap is likely to be set much higher than the standard increment.

It is also noted that alternative adjustments to the gapping period such as multiplying the current gap by a factor to produce a new gapping period may be applied. Thus, a formula such as "new gap=1.15*oldgap" may be used.

So long as counter 1 remains above the upper threshold, each time period TB expires, the respective counter period will be incremented. This incrementation is indicated in the area A to B of the graph of FIG. 5. Thus as traffic for the specified destination increases the gapping period instruction returned to the service switching points rises rapidly. Accordingly, as the period between calls offered to the service control point 8 increases, since the processors of the service switching points 21 to 2N in response to the gapping message do not attempt call switching, the ability of the traffic servers to handle offered calls within the required quality of service time improves. This allows the counter 1 to drop at the "leaky bucket" rate since calls are failing the test or being rejected at less than the decrementation interval and as indicated at point C on the next comparison of the counter 1 with the preset thresholds as the counter is between threshold 1 and threshold 2 no increase in the current gap is applied, no further change occurs in the current gap until at point D where the value of counter 1 has dropped below the lower threshold 2 in which case the current gap is decreased.

It is noted that crossing of the lower threshold may automatically trigger decrementing of the respective gapping period without waiting for the expiry of the period TB. Each crossing of the upper threshold value results in an increase in the gapping period while each crossing of the lower threshold value results in a decrease in the gapping period. This effect is shown in the area D to E as counter 1 is found to be varying above and below the two thresholds and the counter will be decremented and incremented at each threshold crossing. The section between point E and point F, where the counter varies above threshold 1 or below threshold 2 alternately resulting in incrementation and decrementing of the current gap period in respect of this call, indicates that a balance between call rejection and call switching in response to demand has been achieved. Now at point F as customer demand for connection through the network decreases counter 1 will be decremented at a rate greater than the call failure rate and remains below threshold 2. The current gap is thus reduced at each successive expiry of period TB and the percentage of calls offered which succeed in being connected will increase. Note that as with incrementing of the gapping period, decrementing is not necessarily in fixed steps but may use a formula such as "newgap=0.9*oldgap". Again at point G where the number of call offerings stabilises and counter 1 of the traffic server 1 remains between the upper and lower thresholds current gapping period returned to the processors 11–14 of the service switching point remains stable. Finally (not shown) when the counter 1 reaches 0 or remains below the threshold 2 each application of traffic server comparison will result in gapping period being decremented until no further gapping is required and all calls offered to the network for the appropriate destination are handled.

Now as has previously been stated calls are offered to the traffic servers 81 to 8N on a distributed basis so that gapping of calls in a focused overload situation including individual servers' perception of the platform overload can result in service switching points receiving timing instruction from more than one of the traffic servers. While it is possible to use a single counter for all of the active traffic servers in a service control point 8 this could result in a single point of failure being present and further reliability may be achieved by ensuring that a minimum number of single failure points are present in the network. Thus each of the servers 81 to 8(N) may be provided with the ability to return gapping in response to individual sets of counters and thresholds held in its own data store. This also avoids conflict between servers in seeking to obtain access to a single counter and/or single gapping arrangement. However, one disadvantage of having multiple counter arrangements in a single service control point is that one traffic server may become seriously out of line with the gapping arrangement of the others. This can occur for example if a heavy processing load on one traffic server for a different call results in a quality of service failure at a higher rate on, say, traffic server 83. It will be appreciated that as calls are distributed sequentially, the fact that the traffic server 83 is returning a longer gap in an attempt to control its own overload will not result in diminution in the number of calls offered to the server as, on average, it will continue to receive the same number of calls for translations as each of the other servers 81, 82 to 8N. Traffic offered may therefore become more bursty resulting in the respective counter exceeding its threshold and the further incrementation of the respective counter by traffic server 83 while the reduction in traffic calls by the elongated from server 83 results in the other servers having a lower loading capability and their own gapping period being reduced.

In order to prevent variations in gapping periods, degrading customer service an alignment scheme is provided. The objectives of this alignment scheme is to bring the gapping period for each of the servers 81–8N in to line with each other. Thus, while individual servers continue to maintain counters and thresholds and will implement and decrement their own current gapped, by communicating for each gapped network number, the current GAP value from each of the servers, the current GAP may be forced to an arithmetic average of the GAPs of all of the servers 81–8N which provides an alignment value unbiased relative to the values input by individual controlling functions. Features of the schemes hereinafter described are designed to avoid delay of adaptation of control and are not affected by the failure of any individual server and to all intent and purposes are independent of a single supervisor component within the service control point 8. The avoidance of local area networks traffic between servers and minimising the loading of traffic servers 81–8N and application of overload control for an excessive period of time are of prime consideration. Several schemes are considered hereinafter based on a logical communication ring between the traffic servers.

Within the service control point 8 there will be a directory server function (not shown) which contains a local area network address for each overload control function running in a traffic server 81–8N. This server can accept a function identifier from one traffic server, for example an identifier of an OCF (Overload Control Function) supervisor and respond with a local area network address and processor name. This directory server may respond with a list of all overload functions within the service control point 8 together with their respective local area network addresses and process names. Where logical ring structures are required, (note there is not necessarily any physical ring structure) the directory supervisor may enlist the OCF's in the order of the logical ring. Note that the directory server function may be embedded in one or more of the traffic servers and will have a fail-over arrangement such that in the event of a failure of one directory server, another server is available and will automatically take control.

Now in a first scheme for aligning the values of the counters in each traffic server in respect of a particular gapped network number at periodic intervals, each of the servers causes its overload control function to send all current gap values in respect of controlled calls to every other overload control function in each of the other traffic servers. Every overload control function maintains an average gap value for each demand and will relapse its own gap value for respective demands towards this average. Such a broadcast scheme has the advantage of not requiring a central entity nor any ring structure as such and there is only 1 message type comprising the identity of the gap number and the value of the current gap.

The server overload control function on receipt of such messages will accumulate the values of all the gaps and divide by the number of servers including its own values to determine the average gap value per gapped, number across the service control point 8 and will relax its current gap value towards the average value whether higher or lower. The principle disadvantage of the scheme of this kind is the large number of messages required to be transferred between the traffic servers 81–8N which may create an additional software overhead within the computation power of the traffic servers.

Thus, in an alternative arrangement a ring based gap value adaptation scheme may be provided. In this scheme, when a traffic server say 81 first commences gapping a particular demand, and assuming that it does not have a record of any other traffic server 82–8(N) currently gapping. Its overload function will initialise a list containing the identity of the controlled demand and its current gap. The server may now transmit the list to the next OCF in the logical ring and each successive OCF in the ring will append respective values for the gap demand identity to the list. The receiving overall control function (OCF) on receipt of a list first overwrites its own previous value in the list if present with its current value or adds its own identity and current gap value to the list and uses all of the values present to calculate the current average gap. After a short wait period which determines the iteration time for alignment the list is passed to the next overload control function in a logical ring. The single list per gapped demand identity will circulate until the overload control function is no longer required.

In order to establish correct ring routing when an overload control function in one traffic server 81–8N initiates a list, it may request a list of currently active OCF LAN addresses and process names from the directory server of the service control point 8. Having obtained such a list, it may now enter the gap demand identity in its own current gap and will mark the gap list message as on orbit 1 before forwarding the message to the next OCF immediately following itself in the list of OCFs. The identified address of the next OCF will be used for forwarding all gap list messages for all demand identities.

On receiving a message marked orbit 1 which itself did not initiate an OCF will obtain a list of other OCFs LAN identities and will forward the gap list message to the next OCF in its logical ring.

The originating OCF, that is the one which first started gapping the current demand identity on receiving its own orbit one message back removes the orbit one marking so that subsequent orbits do not require access to the directory service. Any OCF which receives a message marked as orbit one enters its own identity and value and forwards the message without delay to reduce the probability that multiple messages in respect of the same gap demand identity will be generated when a search first occurs. However, in order to ensure that there is no more than one list circulating for a given controlled demand an OCF which initiates a list may add an identifier made up of its own platform identity and a time stamp. Subsequent overload control functions in the logical ring do not change the identifier, however, if the originating OCF receives a gap list for a dialled number with a different identifier (which may have been initiated by a different OCF) it performs the standard overwriting of its own gap within the list and retains the list for a random period prior to forwarding to the next function in the ring. If its own initiated list arrives or another list for the same gap identity arrives prior to sending on the first receive list, the first OCF mergers the list, thus creating a single list containing gap values from the later arriving list where these are available. If a later arriving list contains blank fields, the originating OCF may use gap values from the earlier arriving list and may clear that list forwarding the cleared list by the merged list. The empty list is sent to inform the function which initiated the list that it has been merged. An intermediate OCF receiving an empty list which it neither initiated nor merged will forward it immediately while the function receiving an empty list which it previously initiated deletes the list and stops its circulation. If an OCF receives a list which it emptied it will delete it on the assumption that the subsequent OCF may have failed.

In order to ensure that one list always circulates for a given controlled demand, when an OCF forwards a gap list message which it initiated as shown by the OCF identifier at the start of the list it sets a timer in the value which is a multiple of the nominal—time for alignment. If the timer expires prior to receipt of the list back around the logical ring, then a new list may be initiated. Thus if a failure of a local area network link or one of the overload control functions results in a circulating list being lost a replacement list will be generated. However, a replacement message will always be tagged orbit one, thus causing all of the overload control functions to apply to the directory server to ensure routing around any server which has subsequently failed. Similarly the orbit one tag causes the new list to be processed and forwarded without delay rather than waiting for the predetermined alignment time gap.

In order to guard against the originating server for a particular gap message failing whenever an OCF forwards a gap list message in respect of a particular gap demand identity then it sets a timer having a value slightly greater than the nominal circulation time so that if the timer expires, it will generate a new orbit one gap list message. This should ensure that as this message is forwarded without deliberate delay, only a single replacement message is generated by the OCF immediately following the failed traffic server in the logical ring.

Note this scheme does not require any specific supervisor function and is secure against single or multiple traffic server failures. The scheme has fewer messages than the previous broadcast scheme. In a further alternative rather than forwarding a list comprising the gap values for all of the OCFs in the traffic servers 81 to 8N, a gap identity composing a single value is circulated around the ring. On receipt of the gap identity the receiving OCF uses the value received as the average over its peers. The received value is multiplied by a factor $(1-\alpha)$ and the product of $\alpha$ and its own current gap are added to produce an average value which is forwarded to the next OCF in the ring. Finally the initially received value is used to modify its own current value towards the average. This reduces the amount of LAN traffic compared to the previous scheme because the message length is substantially reduced. Routing and number of messages controlled are as per the previous scheme.

In a further variant of the averaging scheme mentioned a single message is provided for several gap identities each with a gap identifier and a moving average value circulating around the logical ring.

In a further alternative arrangement for controlling variation in gapping between gap identities a separate supervisor for overload functions may be provided in one or more of the traffic servers. Thus when an OCF in one of the traffic servers starts to control a dialled number it informs the supervisor of the number and its gap value. The supervisor now periodically requests gap values for the specific dialled number from all of the OCFs within a cell. Each of these OCFs will reply with a gap for the respective dialled number receiving in reply the gap value for that number averaged over all OCF instances in the cell. For each dialled number currently being gapped the supervisor maintains a list of gap values with one entry per OCF.

In order to avoid the failure of a single supervisor component, the supervisor function may be present in each overload control function of each of the traffic servers 81–8N. One of the overload control functions will act as supervisor for a particular number and will request the other OCFs in the ring or cell to provide relevant gapping data to distribute. In both supervised schemes, there are variations in which the supervisor may send a previous average value at the time of requesting new current gap values thus reducing the number of messages circulating in the logical ring. The alternative is to collect current gap values on a requested basis, calculate the average and forward a gap value message to each OCF in the ring. Message passing between functions logical rings by way of local area networks is well known and it is not therefore necessary to describe the process in detail in this specification. However, the transfer of gapping values around the logical rings and the avoidance of imbalances arising from failure of a node in logical ring helps to avoid the gap time period for any one controlled destination running significantly out of line. Referring now to FIG. 6 and in particular to FIG. 6A, one method of creating a logical ring without requiring a yellow pages or supervisor function to transfer a complete list of all OCFs at any one time will now be considered.

The only requirement here is that there is a point at which the address of at least one overload control function running in the service control point 8 can be obtained. The establishment of the ring will be considered hereinafter, but initially consider a group of five traffic servers for convenience referred to as FS1 to FS5 with a clockwise direction of message transmission as shown by solid lines in FIG. 6A and with a requirement that each file server knows the address of the overload control function in a predecessor file server in the ring and a successor server in the ring. For example, FS1 will forward overload control gapping messages to FS2, FS2 to FS3 and so on around the ring. The overload control function of FS1 will know that it receives messages from FS5 and forwards them to FS2, FS2 will be aware that it receives messages from FS1 and forwards them to FS3 as indicated by the short arrows in FIG. 6A.

Now assuming that on transmitting a message to a successor node the OCF of FS1 for example commences a heartbeat timer such that if it's predecessor FS5, fails the timer will expire without receipt of a further message from it by FS1. Then it is possible to adopt a convention that successor nodes may react to failure of the predecessor and seek to re-establish the ring excluding the failed predecessor. Consider then FIG. 6B, if the server FS4 or its overload control function fails, FS5 will detect the failure and react by sending a failure message containing its address and the address of its failed predecessor FS4 in the clockwise direction around the ring. As neither FS1 nor FS2 recognise the address of FS4 the message is simply passed on around the ring. FS3 however will recognise the address of FS4 as being the address of its current successor and will now replace its successor address field with the address of FS5 and will transmit a message to FS5 identifying itself. FS5 therefore replaces its predecessor address field with the address of FS3 and FS4 is excluded from the ring. Messages may now continue to be passed around the ring without intervention from an overall supervisor function.

Figure 6A:
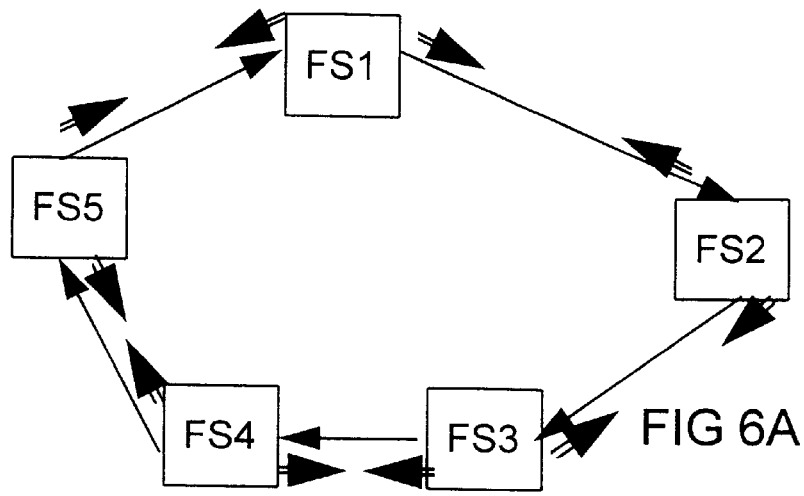
Figure 6B:
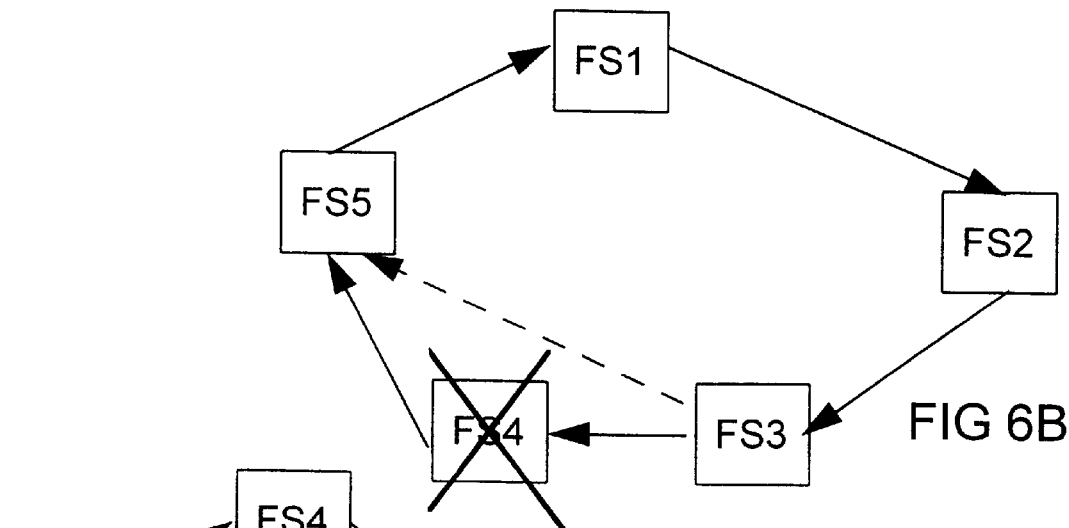
Figure 6C:
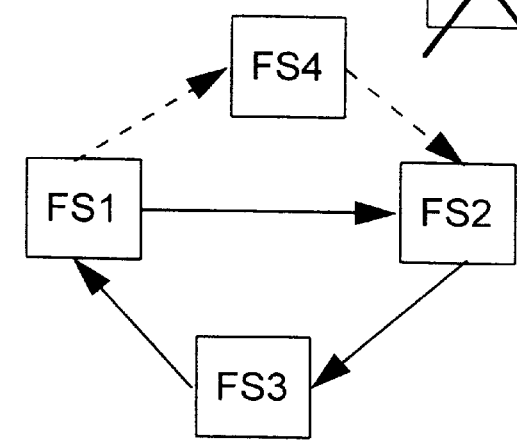

If a new node starts to function outside of an established ring it needs to be brought into the system. Thus, if this is the first gapping event for example, for FS4 and there is a logical ring already in existence comprising FS1, FS2 and FS3 as shown in FIG. 6C. FS4 on application to the controller to determine what OCF functions are running in the service control point may receive the address of the overload control function running in FS2. FS4 forwards a start up message to FS2 indicating its address. FS2 responds by sending a message to the FS4 address containing the address of its current predecessor that is FS1 and sends a message to FS1 also indicating the address of FS4. FS2 now replaces its predecessor address field by deleting the address of the OCF in FS1 and entering the address of the OC function of FS4. FS1 on receipt of the start up message from FS2 replaces its successor address field with the address of FS4 thus introducing the new OCF function into the ring.

Figure 6D:
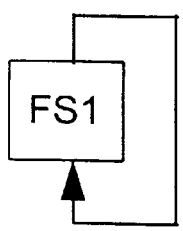
Figure 6E:
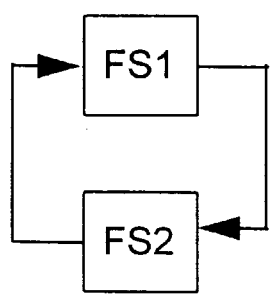
Figure 6F:
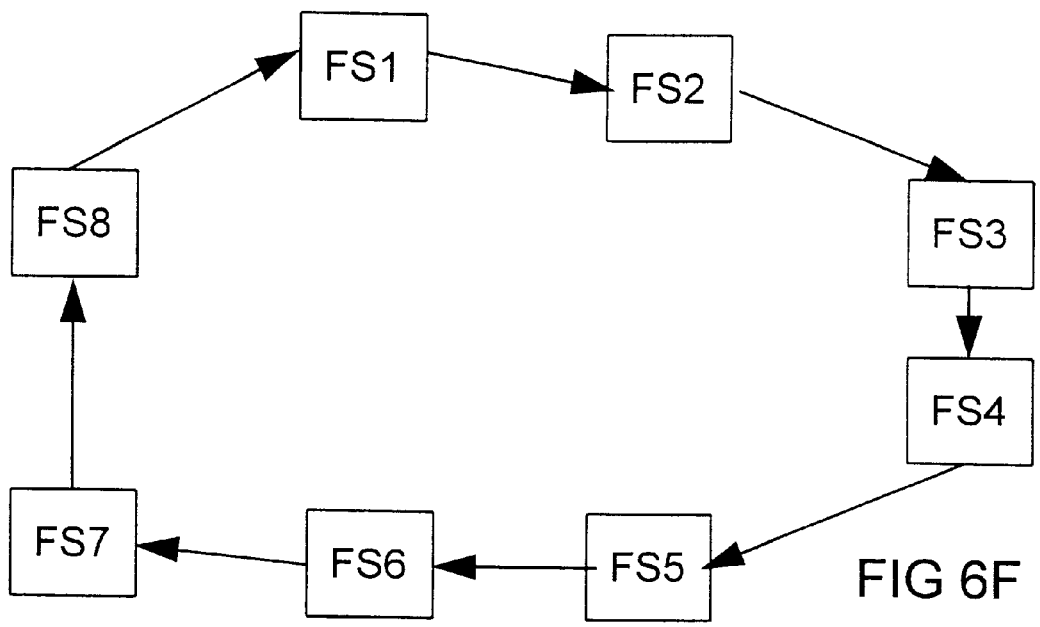
Figure 6G:
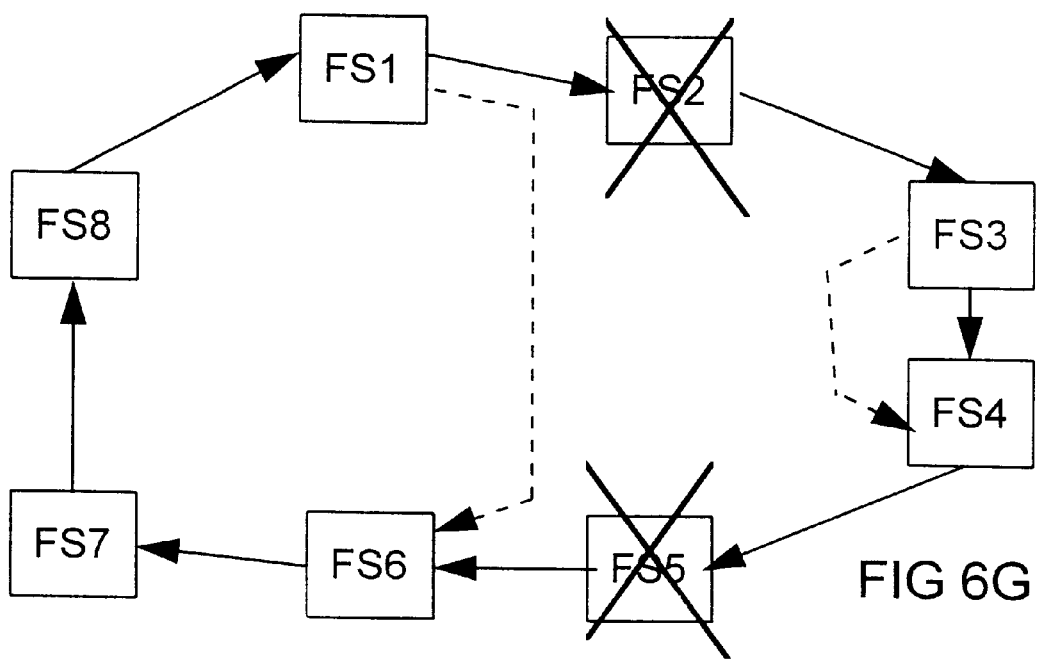

Such an expansion can work if only a single OCF function is running say in FS1 as indicated in FIG. 6D by arranging that the successor and predecessor fields of FS1 contain its own address in its start up mode. When the OCF function commences say in file server two then FS2 applies to the supervisor function for the identity of an OCF function and receives the address of the OCF function for file server 1. FS1 on receiving a greeting message from FS2 replaces its own address in the predecessor field with the address of FS2 forwards its own address to FS2 and the address of its previous predecessor ie itself so that FS2 now overwrites both its successor and its predecessor field with the address of FS1 and forwards its own address again to FS1 as the new successor.

Where several OCFs are running in a logical ring in several file servers it is possible for multiple failures to occur. Consider then the ring shown in FIG. 6F and FIG. 6G comprising OCFs running in 8 file servers and in which for example the file server FS5 fails. FS6 will forward a message with its address and that of its failed predecessor. Now if while this message is in transit FS2 also fails then when the message from FS6 reaches FS1, FS1 being aware that FS2 has failed will recognise that FS5 is not its successor. It will however send a message to FS6 exactly as if it were the predecessor of the failed node FS5. Thus a separate sub-comprising file servers FS1, FS6, FS7 and FS8 become established. Similarly, as node FS3 forwards a message reporting failure of its predecessor FS2, FS4 recognising that FS5 has failed will forward a message to FS3 as it if were the predecessor of failed node FS5 resulting in the establishment of a sub-ring comprising FS3 and FS4.

One of the two partitioned sub-rings should contain the original circulating list of gapping values or each of the gapping lists will be present in at least one of the nodes, unless a particular list was present in FS2 or FS5 at the time at which the particular OCF failed. However, re-generation of a replacement list as a result of its non return around the ring will occur as previously described.

This will result in gapping adjustment lists in each of the sub-rings for each gapped value.

In order to recombine logical rings which have arisen as a result of more than one node in the ring failing, if the file server holds addresses for predecessor and successor information in non-volatile storage then on restarting rather than seeking an address value for an OCF function for example an ORBIX control function it is arranged to greet its former successor in the same way as discussed with relation to FIG. 6C. Thus if for example FS5 recovers before FS2 then it will forward a message to FS6 and will receive the identity of FS1 as FS6's predecessor node. This results in FS5 being incorporated in to a ring comprising FS1, FS5, FS6, FS7 and FS8. FS5 having rejoined the partitioned ring recognises that FS1 is not the same as its former predecessor and will address a message to FS4 indicating that it should now become successor to FS4. If FS4 is on line then FS5 will replace its predecessor node address with the address of FS4, FS4 will accept its successor node is to become FS5 and will forward a message to FS3 indicating the former predecessor i.e. FS1 of FS5 on restart. This results in FS3 replacing its predecessors indication with the address of FS1. FS1 is notified by FS4 that its successor should now be FS3 thus re-incorporating FS3 and FS4 into the main ring.

This message sequence between FS4 and FS5 is effectively your successor equals me, my predecessor equals you, your successors predecessor equals my predecessor, my predecessors successor equals your successor.

In order to avoid multiple circulating lists, a node which has failed and then greeted its original predecessor is responsible for running a further program to check for the condition of more than one circulating list for any gapping event. The re-starting node will delete a second circulating list plus re-establishing the correct message sequence.

It will be noted that if FS2 restarts subsequent to the restart of FS5 on greeting FS3 as its former successor it will receive FS1 as the predecessor and the comparison between stored predecessor address and current predecessor address will not result in any attempt to amalgamate sub-rings since FS2 will not note any partition having occurred. It will be noted that even if a partitioned ring results in a single file server forming a trivial ring as indicated in FIG. 6D on re-start the single ring will be appropriately re-incorporated into the main ring.

While as hereinbefore described the invention has been described with reference to an intelligent network wherein the overload control function runs in a service control point, it will be appreciated that the overload control function described could be used in the processing arrangement of switches in a more traditional telecommunications network. In such a case, messaging between switches to communicate the respective gapping periods from individual switches in the network to particular destinations is used so that serious network differences in quality of service between switch units is avoided.

What is claimed is:

1. A telecommunications network including an overload control arrangement, the overload control arrangement restricting call connections to a predetermined destination when traffic to such a destination exceeds a predetermined level, said arrangement comprising a plurality of identical overload control functions, each running in a respective one of a plurality of nodes of the network and each having a respective gapping period determined from the perceived overload level at the respective nodes, the overload control functions including means for exchanging data defining their respective gapping periods and each said overload control function effecting adjustment of its respective gapping period towards an average gapping period so that substantial differences between respective gapping periods from respective nodes to any one predetermined destination are avoided.

2. A telecommunications network as in claim 1, wherein:

each overload control function allocates a respective one of a plurality of counters to each of a plurality of controlled destinations, each counter containing a non-zero value being decremented at a pre-determined regular rate and incremented each time a call to its respective controlled destination fails a pre-determined quality of service threshold, each overload control function includes comparison means which compares the value in each counter at periodic intervals and if the respective value held in any counter exceeds a first threshold value causes a step increase in the gapping period associated with the respective controlled destination.

3. A telecommunications network as in claim 2, wherein, if the respective value held in any counter is below a second threshold values the comparison means causes a step decrease in the gapping period associated with the respective controlled destination.

4. A telecommunications network as in claim 1 wherein:
the network comprises a service control platform and a plurality of service switching points each having a respective processor means,
the service control platform comprising a plurality of servers to which instruction requests from the service switching points are directed,
each server running an overload control function and providing switching and call gapping instructions in response to received instruction requests.

5. A telecommunications network as in claim 4, wherein each overload control function on detecting, in respect of an instruction request to a particular destination, a first failure to meet the pre-determined quality of service threshold allocates one of the plurality of counters to that destination and commences transmitting a list in respect of that destination to other services, said list identifying the destination and a current gapping period therefore.

6. A telecommunications network as in claim 5, wherein:
on commencing a list the overload control function obtains an address for at least one other overload control function at the service control platform and forwards a message including the list,
each overload control function on receiving the list adding its own current gap value to the received gap value to determine an average gapping period and substituting an average gap value in the list, obtaining an address of at least one other overload control function and forwarding the list to the other overload control function whereby a logical communication ring is established for the list.

7. A telecommunications network as in claim 5, wherein:
on commencing a list the overload control function obtains an address for at least one other overload control function at the service control platform and forwards a message including the list,
each overload control function on receiving a list on first circulation adding its own current gap value to the list, obtaining an address of at least one other overload control function and forwarding a message including the list to said other overload control function whereby a logical communications ring is established for the list.

8. A telecommunications network as in claim 6, wherein:
each overload control function uses a received list to calculate an average value for the current gapping period to the respective destination.

9. A telecommunications network as in claim 6 in which subsequent messages containing respective updating gapping values are passed around the logical communications ring at periodic intervals.

10. A telecommunications network as in claim 9, wherein each message includes respective gapping values for a plurality of controlled destinations.

11. A method for overload control in a telecommunications network by restricting call connections to a predetermined destination when traffic to such a destination exceeds a predetermined level, said method comprising:
running substantially identical overload control functions in each of a plurality of network switching nodes, each said function determining a respective gapping period from a locally perceived overload level at its respective node,
exchanging data between said functions defining their respective gapping periods and effecting adjustment thereof towards an average gapping period so that substantial differences between separately determined respective gapping periods from respective nodes to any one predetermined destination are avoided.

12. A method as in claim 11 wherein:
each overload control function allocates a respective one of a plurality of counters to each of a plurality of controlled destinations,
each counter containing a non-zero value being decremented at a pre-determined regular rate and incremented each time a call to its respective controlled destination fails, a predetermined quality of service threshold,
each overload control function comparing the value in each counter at periodic intervals and if the respective value held in any counter exceeds a first threshold value, effecting a step increase in the gapping period associated with the respective controlled destination.

13. A method as in claim 12 wherein, if the respective value held in any counter is below a second threshold value, a step decrease is effected in the gapping period associated with the respective controlled destination.

14. A method as in claim 11 wherein:
the network comprises a service control platform and a plurality of service switching points each having a respective processor means,
the service control platform comprising a plurality of servers to which instruction requests from the service switching points are directed,
each server running an instance of said overload control function and providing switching and call gapping instructions in response to received instruction requests.

15. A method as in claim 14 wherein each overload control function on detecting, in respect of an instruction request to a particular destination, a first failure to meet the predetermined quality of service threshold allocates one of the plurality of counters to that destination and commences transmitting a list in respect of that destination to other services, said list identifying the destination and a current gapping period therefore.

16. A method as in claim 15 wherein:
on commencing a list the overload control function obtains an address for at least one other overload control function at the service control platform and forwards a message including the list,
each overload control function on receiving the list adding its own current gap value to the received gap value to determine an average gapping period and substituting an average gap value in the list, obtaining an address of at least one other overload control function and forwarding the list to the other overload control function whereby a logical communication ring is established for the list.

17. A method as in claim 15 wherein:

on commencing a list, the overload control function obtains an address for at least one other overload control function at the service control platform and forwards a message including the list, each overload control function on receiving a list on first circulation adding its own current gap value to the list, obtaining an address of at least one other overload control function and forwarding a message including the list to said other overload control function whereby a logical communications ring is established for the list.

18. A method as in claim 17 wherein:

each overload control function uses a received list to calculate an average value for the current gapping period to the respective destination.

19. A method as in claim 17 in which subsequent messages containing respective updating gapping values are passed around the logical communications ring at periodic intervals.

20. A method as in claim 19 wherein each message includes respective gapping values for a plurality of controlled destinations.

* * * * *